United States Patent [19]

Tanimoto

[11] Patent Number: 4,855,837
[45] Date of Patent: Aug. 8, 1989

[54] A VIDEO COVER & VIEWFINDER ACCESSORY FOR A STILL CAMERA

[75] Inventor: Tetsuyuki Tanimoto, Osaka, Japan

[73] Assignee: Minolta Camera Kabushiki Kaisha, Osaka, Japan

[21] Appl. No.: 157,635

[22] Filed: Feb. 18, 1988

[30] Foreign Application Priority Data

Feb. 18, 1987 [JP] Japan ................... 62-36130

[51] Int. Cl.<sup>4</sup> ............. G03B 13/00; H04N 5/225
[52] U.S. Cl. ................... 358/229; 358/225; 358/909; 354/75
[58] Field of Search ........... 358/229, 226, 225, 909, 358/55; 354/75, 76

[56] References Cited

U.S. PATENT DOCUMENTS 4,303,322 12/1981 Someya .................. 354/31
4,742,369 5/1988 Ishii et al. ............. 354/441
4,763,146 8/1988 Niikura ................. 354/75

FOREIGN PATENT DOCUMENTS 52-84831 6/1977 Japan .
54-50320 4/1979 Japan .
56-115133 9/1981 Japan .
1525025 9/1978 United Kingdom .

Primary Examiner—James J. Groody
Assistant Examiner—Robert M. Bauer
Attorney, Agent, or Firm—Price, Gess & Ubell

[57] ABSTRACT

A cover accessory for a still camera permits the replacemet of the film witrh an electronic recording of the video image. An optical system is provided with the cover for re-forming an image of an object, an image having been formed by an objective lens in a predetermined film plane, and providing the image to a photo taking device for electronically recording image data. A relay viewfinder optical systrem is connected optically to the viewfinder of the camera, and indicates at least one viewfinder indication that is proper to the video accessory through the relay viewfinder.

17 Claims, 4 Drawing Sheets

A VIDEO COVER & VIEWFINDER ACCESSORY FOR A STILL CAMERA

BACKGROUND OF THE INVENTION

1. Field of the Invention

The present invention relates to a still videoback attachable to a still camera in place of the back lid thereof for recording an image formed by the objective lens of the still camera on a floppy disk mounted on the accessory.

2. Description of the Prior Art

Recently, an electronic still camera has been proposed in which an object image formed by an objective lens is received by an image sensor such as CCD (charge coupled device) to convert the luminance distribution of the object image into corresponding electric signals, and in which the electric signals are magnetically recorded on a recording medium such as a floppy disk. Since the electronic still camera can convert the object image into the electric signals, the information relating to the object image can be transmitted through a plurality of communication systems as the electric signals. Additionally, the object image can be reproduced on a television set by reproducing the signals recorded on the floppy disk by the still video camera.

Here, the conventional still video camera is designed only for recording the object image on the floppy disk. Another approach that may be considered is that the conventional photographic still camera is utilized for forming the object image to be recorded on the floppy disk. Then, an accessory, attachable to the photographic still camera in place of the back lid thereof, can be considered in which a re-forming optical system is included for re-forming an image of the object image which has been formed by the objective lens of the photographic still camera, on the floppy disk mounted on the accessory.

However, since an area size of the normal image sensor is about a quarter of a frame size of 35 mm film, one of the problems that would be occurred with respect to the area of the object image to be reproduced. This problem can be solved by reducing the image re-formed by the reforming optical system.

However, if the size of the finder image can be altered for indicating the correct area to be reproduced in the finder image, any indication displayed in the periphery of the frame may not be observed by the user in the condition in which the accessory is mounted. Furthermore, it is impossible to display any indication needed only for the accessory.

SUMMARY OF THE INVENTION

One of objects of the present invention is to provide a still video back for a still camera which is capable of indicating both any indication shown in the still camera and at least one indication proper to the still video camera in a view finder thereof.

Another object of the present invention is to provide a still video back being capable of indicating an area to be recorded on the floppy disk together with infinder indications in the view finder thereof.

In order to achieve these objects, according to the present invention, there is provided an accessory attachable to the rear surface of a still camera having an objective lens and a finder optical system, comprising first means for reforming, at a predetermined position, an image of an object image formed by the objective lens at a predetermined focal plane of the still camera; means, located on the predetermined position, for receiving the image of the object image to convert the luminance distribution of the image into electrical signals corresponding to the luminance distribution; means, optically connected to the finder optical system, for relaying a finder image formed by the finder optical system for finder observation; and means for indicating at least one information within an area observed through the relaying means.

BRIEF DESCRIPTION OF DRAWINGS

These and other objects and features of the present invention will become more apparent when the preferred embodiment of the present invention is described in detail with reference to the accompanied drawings in which.

DESCRIPTION OF THE PREFERRED EMBODIMENT

Figure 1:
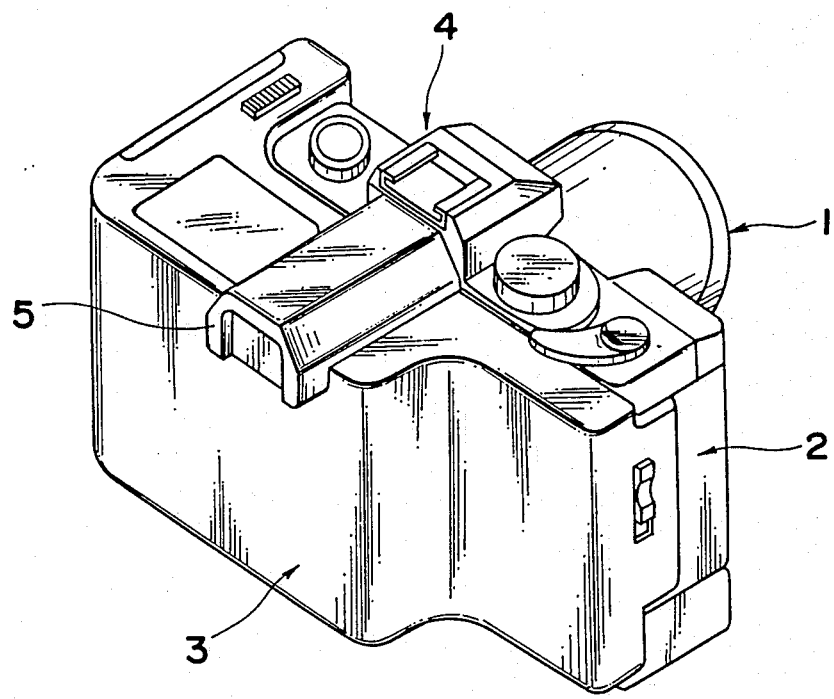
FIG. 1 is a perspective view of a still camera on which a still video back according to first preferred embodiment of the present invention is mounted.

As shown in FIG. 1, an interchangeable objective lens 1 is mounted on a front surface of a body of a single lens reflex camera 2 and a still video back 3 is detachably mounted on the rear surface of the camera body. A view finder 4 is provided on the center portion of the upper cover of the camera body and a relay finder 5 according to the present invention is provided on the center portion of the upper cover of the still video back 3 which is connected to the view finder 4 optically.

An object image to be recorded is observable in the relay finder 5 together with various in-finder indications, as will be disclosed hereinafter.

Figure 2:
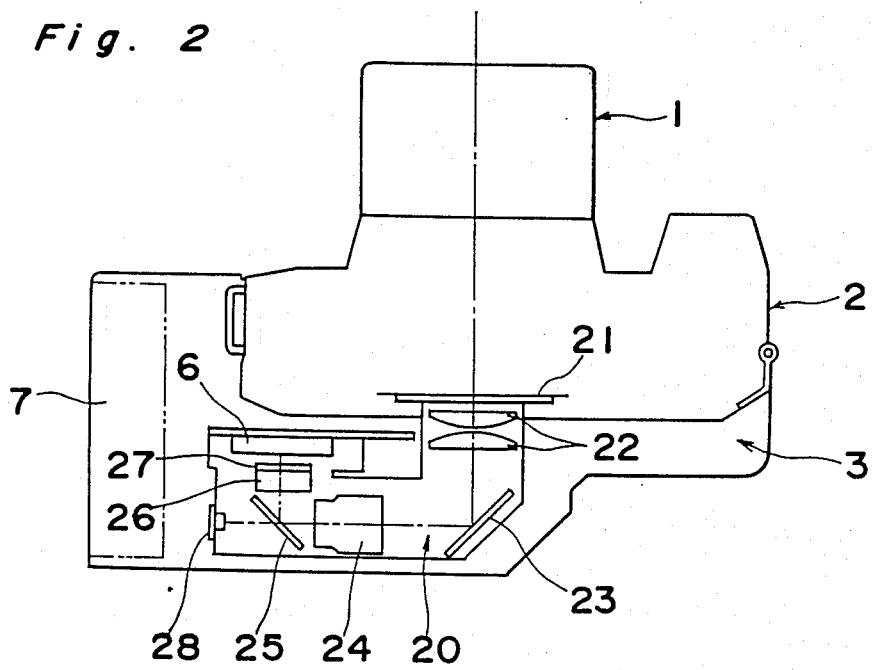
FIG. 2 is a schematic sectional view for showing an internal structure of the still video back shown in FIG. 1.

FIG. 2 shows a schematic sectional view of the still video back 3. This still video back 3 comprises an image relaying optical system 20 for relaying an objective image having been formed on a film plane 21 to reform it on an image sensor 6, for instance, a CCD (charge coupled device), a circuit substrate (not shown) for mounting a signal processing circuit of the sensor 6, a recording circuit therefor and so on, and a recording deck 7 in the body of the still video back. Said image sensor 6 converts the luminance distribution of an image formed on the film plane 21, when receiving thereby, into electrical signals corresponding to the luminance distribution of the video image. The image relaying optical system 20 is comprised of a condenser lens assembly 22, a reflection mirror 23 for deflecting an optical path, an image forming lens block 24, a half-mirror 25 for dividing the optical path, an optical low-pass filter 26 and an infrared ray cut filter 27. Said image relaying optical system 20 is constructed as a contraction optical system for reforming an image contracted to a size of about a half of a normal film size having a diagonal length of 42 mm to project the contracted image on the image sensor 6. This contraction optical system projects a central portion of an object image formed on the film plane 21 onto the image sensor 6 since the image sensor 6 has only a diagonal length of about 16 mm (=⅝ inches). Namely, the whole of an object image formed on the film plane 21 is not projected onto the image sensor 6.

Further, there is provided a light receiving device 28 for detecting a light intensity of an object image passing through the half-mirror 25. A light emission amount of an electronic flash device, when mounted on the camera, is controlled according to the light intensity detected by the light receiving device 28.

Figure 3A:
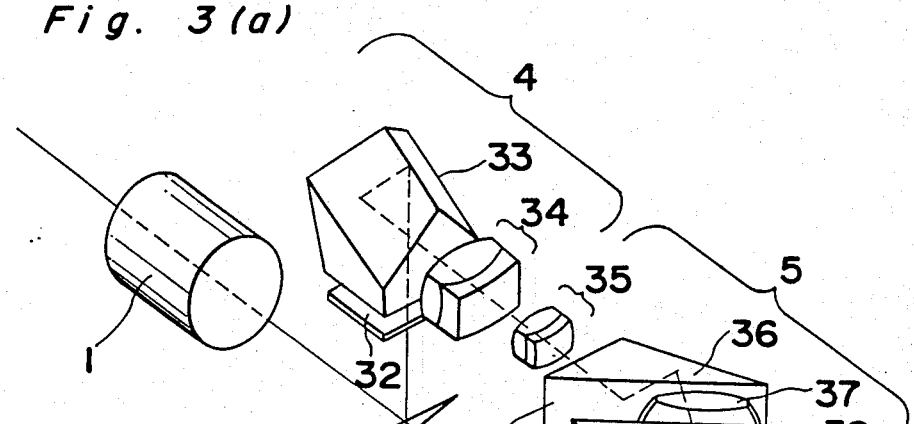
FIG. 3(a) is a perspective view of a view finder of the camera and a relay finder of the still video back according to the embodiment of the present invention.
Figure 3B:
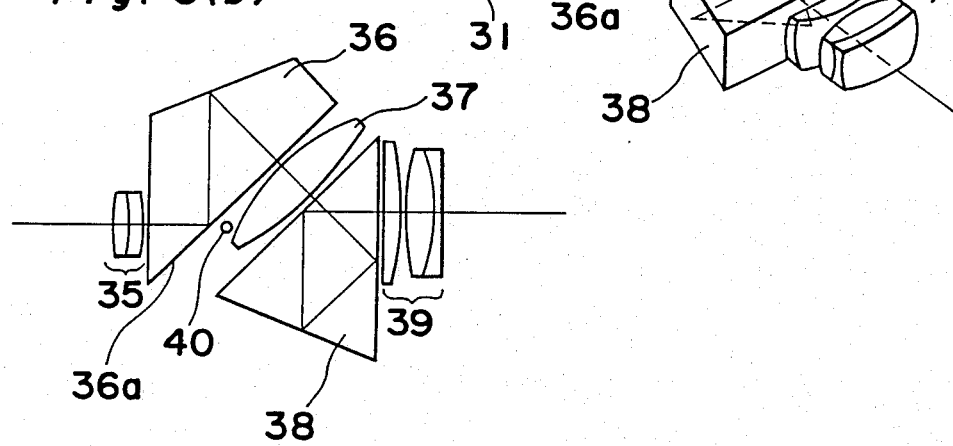
FIG. 3(b) is a plane view of the relay finder of the still video back according to the embodiment of the present invention.

FIG. 3(a) shows the view finder 4 of the camera 2 and the relay finder optical system 5 of the still video back 3 to be connected optically to the former and FIG. 3(b) shows a plan view of the relay finder optical system 5.

As is well known in the camera field, an object image is formed on a focusing screen 32 by the objective lens 1 by the light which has been passed through the objective lens 1 and reflected on a reflex mirror 31. The object image is inverted by a pentagonal roof prism 33 to a non-inverted image and the non-inverted image is observed by the user through an eye-piece lens 34. Accordingly, one can observe a normal object image through the eye-piece lens 34 of the view finder 4.

On the contrary to the above, the relay finder optical system 5 is comprised of an objective lens 35 arranged opposed to the eye-piece lens 34, first prism 36 for deflecting an optical path, a condenser lens 37 arranged near an exit plane 36a of the first prism 36, second prism 38 for deflecting an optical path which is arranged so as for an incident plane thereof to be parallel to the exit plane 36a of the first prism 36 inbetween the condenser lens 37 and an eye-piece lens 39. The objective lens 35 reforms an image of the object image in front of or behind the condenser lens 37 and the image is observed through the eye-piece lens 39.

As is shown in FIG. 3(b), an indication device 40 such as an LED (light emitting diode) for indicating an indication by turning on thereof is arranged in the image reformed plane located between the exit plane 36a of the first prism 36 and the condenser lens 37. This indication device 40 is controlled by a control circuit (not shown) provided in the still video back 3. The indication by the indication device 40 is used for warning of an improper exposure condition or for indicating a recordable state.

Figure 4:
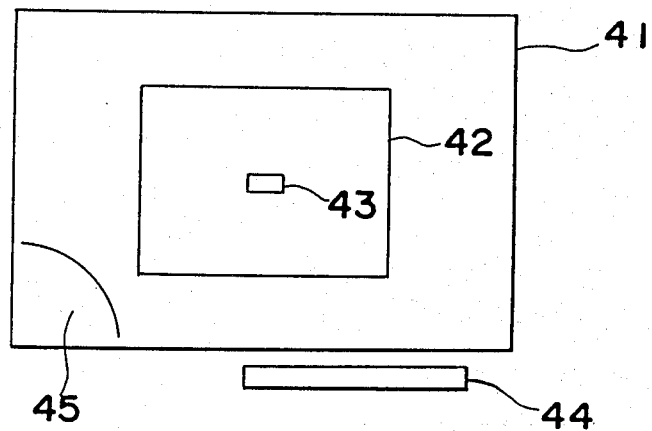
FIG. 4 is an explanatory view showing an indication in the finder when the still video back is mounted on the still camera, according to the embodiment of the present invention.

FIG. 4 shows a whole field of view as shown through the relay finder optical system 5. A frame 41 of the view finder 4 is shown together with a frame 42 of the relay finder optical system 5. It is to be noted that the frame 42 of view of the relay finder optical system 5 is formed to have a size smaller than that of an object image to be recorded actually by the image sensor 6. The frame 42 itself can be provided on the camera body side by forming it with notched lines on the focusing screen 32. In a case wherein it is arranged in the relay finder optical system 5, it can be formed in the exit plane 36a of the first prism 36 since the exit plane 36a is located close to the image reforming plane.

Further, an area indicated by a small rectangular 43 shows an area to be used for detecting a focusing state. Namely, only image data of an object belonging to the area 43 are used for focus detection. An indication 45 obtained when the indication device 40 is turned on is shown in the lower left corner of the frame 41 of the view finder 4. An elongated rectangular 44 is provided beneath the frame 41 for indicating various in-finder indications given from the camera body.

According to the present preferred embodiment, when the relay finder optical system 5 is looked into, an object image to be recorded is observed in the central frame 42 and the frame 41 of the view finder 4 of the camera, the indication 45 obtained when the indication device 40 is turned on and the in-finder indication 44 are observed at the same time in the area outside of the frame 42.

Figure 5:
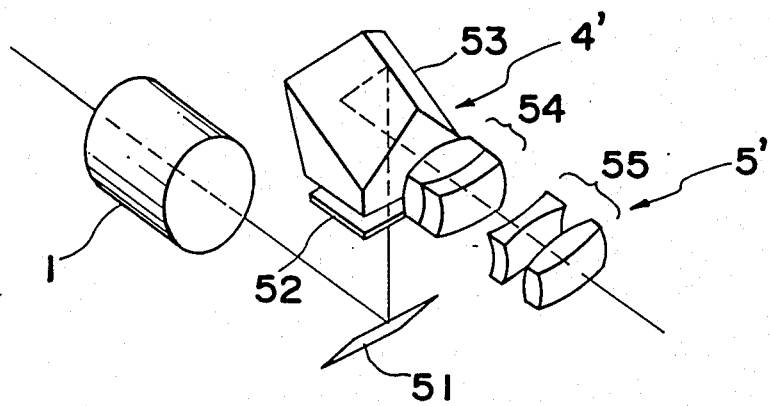
FIG. 5 is a perspective view of a view finder of the camera and a relay finder of the still video back according to a second preferred embodiment of the present invention.
Figure 6:
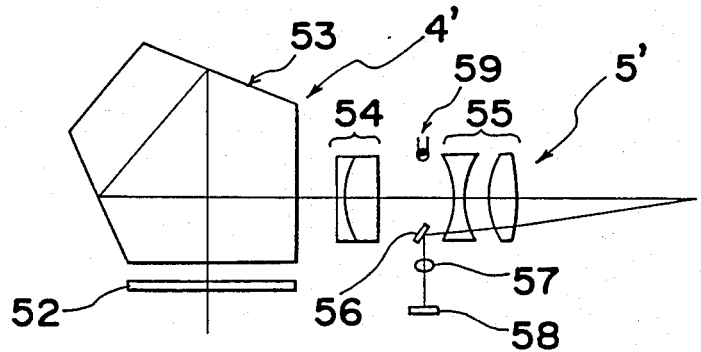
FIG. 6 is a side elevational view of the view finder optical system shown in FIG. 5.

FIGS. 5 and 6 show another preferred embodiment of the present invention.

Figure 7:
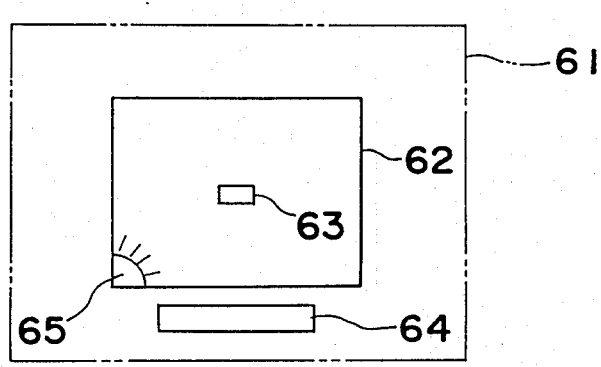
FIG. 7 is an explanatory view showing an indication in the finder when the still video back is mounted on the still camera according to the second preferred embodiment of the present invention.

In this preferred embodiment, there is provided a relay optical system as a relay finder optical system 5' for enlarging a portion of a field image formed by a view finder 4' of the camera (See 61 of FIG. 7), more concretely a field of view (See 62 of FIG. 7) to be recorded by the still video back 3. Since it is not necessary to reform an object image as in the preferred embodiment shown in FIGS. 3(a) and 3(b), the relay finder optical system 5' is constructed of an afocal system which is comprised of of eye-piece lens assembly 55. When the still video back 3 is mounted on the camera body, an eye-piece lens 54 of the view finder 4' of the camera and the eye-piece lens assembly 55 forms an eyepiece lens assembly.

In FIG. 5, reference numeral 51, 52 and 53 denote a reflex mirror, a focusing screen and a pentagonal roof prism, respectively.

FIG. 6 shows a structure for indicating various indications in the finder. In this case, indications of the view finder 4' are disappeared in the image formed by the relay finder optical system 5' when the latter is connected optically to the view finder 4' by mounting the still video back 3 on the camera. In order to solve this problem, there are provided a mirror 56 and a focusing lens 57 for indicating an indication provided by the view finder 4' in the finder even if the still video back is mounted. Namely, the indication, indicated by a display device 58 which is provided in the camera body, is relayed by the focusing lens 57 and the mirror 56 so as to indicate it in the relay finder optical system 5'. Further, an indication device 59 is arranged between the eye-piece lens 54 of the view finder 4' and the eye-piece lens assembly 55 of the relay finder optical system 5' in order to indicate an indication proper to the still video back 3 such as a warning of an improper exposure condition or indication for indicating a recordable state.

According to the present preferred embodiment, when the relay finder optical system 5' is looked into, an object image is observed in a frame 62 together with a frame 63 showing a focus detection area and an indication 65 by the indication device 59. And in-finder indication of the camera side are indicated in an elongated area 64 which locates beneath the frame 62. However, a frame 61 of the view finder 4' cannot be observed in the relay finder optical system 5' since it is enlarged too large to observe in the latter, as is shown by a chain line in FIG. 7.

According to the present preferred embodiment, it becomes easy to confirm an object upon recording with the use of the still video back 3 since the image of the object is enlarged by the relay finder optical system 5'.

Figure 8A:
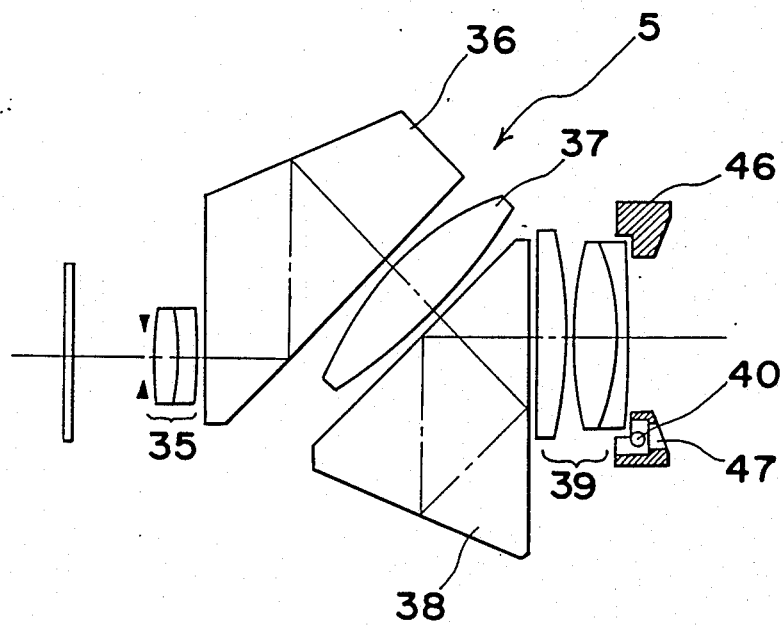
FIGS. 8(a) and 8(b) are side elevational views showing variations of the first and second preferred embodiment of the present invention, respectively.

FIG. 8(a) shows a variation of the first preferred embodiment.

In this variation, there is provided an indication device 40 such as an LED for an in-finder indication for the still video back 3 in a frame 46 of the eye-piece lens assembly 39 of the relay finder 39. The frame 46 provides an optical element 47 formed with a diffusion plate or the like in order to show a turned-on state of the indication device 40.

Figure 8B:
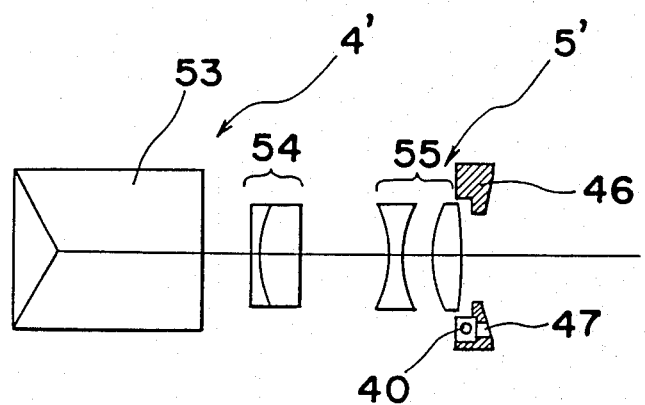

This variation is also applicable to the second preferred embodiment as is easily understood from FIG. 8(b).

The preferred embodiments described herein are illustrative and not restrictive, the scope of the invention being indicated by the appended claims and all variations which come within the meanings of the claims are intended to be embraced herein.

What is claimed is:

1. An accessory attachable to the rear surface of a still camera having an objective lens and a finder optical system, comprising:
    first means for reforming, at a predetermined position, an image of an object image formed by the objective lens at a predetermined focal plane of the still camera;
    means, located on the predetermined position, for receiving the image of the object image to convert the luminance distribution of the image into electrical signals corresponding to the luminance distribution;
    means, optically connected to the finder optical system, for relaying a finder image formed by the finder optical system for finder observation; and
    means for indicating at least one information within an area observed through the relaying means.

2. An accessory as claimed in claim 1, wherein the relaying means includes second means for reforming an image of the finder image.

3. An accessory as claimed in claim 2, wherein the indicating means includes an indicating element located operatively adjacent a position on which the image of the finder image is re-formed by the second reforming means.

4. An accessory as claimed in claim 2, wherein the indicating means includes an indicating element located operatively adjacent the relaying means.

5. An accessory as claimed in claim 4, wherein the indicating means further includes a diffusion plate through which the indication of the indicating element is observed.

6. An accessory as claimed in claim 1, wherein the relaying means includes an afocal optical system.

7. An accessory as claimed in claim 1, further including means for storing the electrical signals of the object image.

8. An accessory attachable to the rear surface of a still camera having an objective lens and a finder optical system, comprising:
    first means for reforming, at a predetermined position, an image of an object image formed by the objective lens at a predetermined focal plane of the still camera;
    means, located on the predetermined position, for receiving the image of the object image to convert the luminance distribution of the image into electrical signals corresponding to the luminance distribution; and
    means, optically connected to the finder optical system, for relaying both of a finder image formed by the finder optical system and other indication displayed by the still camera.

9. An accessory as claimed in claim 8, further comprising means for indicating, in the relayed image, a region corresponding to an area of the image of the object image received by the receiving means.

10. The accessory as claimed in claim 9, wherein the relaying means includes second means for reforming an image of the finder image, and wherein the region indicating means includes a frame located operatively adjacent a position on which the image of the finder image is re-formed by the second reforming means, in order to indicate the region.

11. An accessory as claimed in claim 8, further including means for storing the electrical signals of the object image.

12. In a camera of the type capable of taking pictures with film and having a viewfinder, the improvement of:
    a still video back cover attached to the camera and replacing the normal camera back cover;
    means for converting an image of an object into a corresponding video signal;
    means for recording the video signal, and
    means for modifying the image from the viewfinder while providing operating information with the modified image to the user.

13. A camera as claimed in claim 12 wherein the means for converting an image of an object includes means for directing an object image at a film plane position of the normal camera back cover to a position offset from the film plane position for recording the video signal.

14. A camera as claimed in claim 12 wherein the means for modifying an image includes means for reforming an image of the viewfinder image.

15. A camera as claimed in claim 14 wherein the means for re-forming includes an afocal optical system.

16. A camera as claimed in claim 12, further comprising means for indicating, in the modified viewfinder image, a region corresponding to an area of the image of the object image received by the converting means.

17. A camera as claimed in claim 16 wherein the means for modifying and providing operating information includes a light emitting indicator display for directing information to the user by light emitted from the display with the modified image.

* * * * *